US011247574B2

(12) United States Patent
Murai et al.

(10) Patent No.: US 11,247,574 B2
(45) Date of Patent: Feb. 15, 2022

(54) VEHICLE LOWER SECTION STRUCTURE

(71) Applicant: TOYOTA JIDOSHA KABUSHIKI KAISHA, Aichi-ken (JP)

(72) Inventors: Daisuke Murai, Toyota (JP); Yoshiki Terada, Nagoya (JP)

(73) Assignee: TOYOTA JIDOSHA KABUSHIKI KAISHA, Aichi-Ken (JP)

( * ) Notice: Subject to any disclaimer, the term of this patent is extended or adjusted under 35 U.S.C. 154(b) by 187 days.

(21) Appl. No.: 16/785,659

(22) Filed: Feb. 10, 2020

(65) Prior Publication Data

US 2020/0298715 A1 Sep. 24, 2020

(30) Foreign Application Priority Data

Mar. 19, 2019 (JP) .............................. JP2019-050779

(51) Int. Cl.
| | | |
|---|---|---|
| *B60L 53/12* | (2019.01) | |
| *B62D 21/11* | (2006.01) | |
| *B62D 25/20* | (2006.01) | |
| *B60K 1/00* | (2006.01) | |
| *H02J 7/02* | (2016.01) | |
| *H02J 50/10* | (2016.01) | |
| *B60K 6/26* | (2007.10) | |
| *B60K 6/28* | (2007.10) | |

(52) U.S. Cl.
CPC .............. *B60L 53/12* (2019.02); *B60K 1/00* (2013.01); *B62D 21/11* (2013.01); *B62D 25/2072* (2013.01); *H02J 7/02* (2013.01); *H02J 50/10* (2016.02); *B60K 6/26* (2013.01); *B60K 6/28* (2013.01); *B60Y 2200/91* (2013.01); *B60Y 2200/92* (2013.01); *B60Y 2300/91* (2013.01)

(58) Field of Classification Search
CPC ..... B60L 53/12; B62D 21/11; B62D 25/2072; B60K 1/00; H02J 7/02; H02J 50/10; B60Y 2300/91; B60Y 2200/91
See application file for complete search history.

(56) References Cited

U.S. PATENT DOCUMENTS

| | | | |
|---|---|---|---|
| 2015/0061583 A1 | 3/2015 | Nakamura et al. | |
| 2018/0148109 A1 | 5/2018 | Ayukawa | |
| 2018/0370568 A1* | 12/2018 | Ayukawa | ............... B62D 21/02 |
| 2019/0061533 A1* | 2/2019 | Wang | ........................ B60L 1/20 |
| 2019/0199133 A1* | 6/2019 | Yuasa | ..................... H01F 38/14 |
| 2019/0351946 A1* | 11/2019 | Eklund | .................. B62D 21/11 |
| 2020/0047633 A1* | 2/2020 | Asai | .......................... B60L 5/00 |
| 2020/0063614 A1* | 2/2020 | Dudar | .................... F01M 5/001 |
| 2020/0298715 A1* | 9/2020 | Murai | ..................... B60L 53/12 |
| 2020/0406774 A1* | 12/2020 | Tsukamoto | ............. B60L 53/66 |
| 2021/0268922 A1* | 9/2021 | Oyaizu | ................... H02J 50/60 |

FOREIGN PATENT DOCUMENTS

| | | |
|---|---|---|
| JP | 2013-219861 A | 10/2013 |
| JP | 2014-128124 A | 7/2014 |
| JP | 2018-86906 A | 6/2018 |

* cited by examiner

*Primary Examiner* — Erez Gurari
(74) *Attorney, Agent, or Firm* — Hauptman Ham, LLP

(57) ABSTRACT

A vehicle lower section structure includes, a suspension member; a contactless charging module attached to the suspension member and configured to receive power from a power supply module without contact; and an electrically conductive under-cover disposed adjacent to the contactless charging module in a vehicle front-rear direction at a vehicle lower side of the suspension member, and covering the suspension member from the vehicle lower side.

15 Claims, 7 Drawing Sheets

VEHICLE LOWER SECTION STRUCTURE

CROSS-REFERENCE TO RELATED APPLICATION

This application is based on and claims priority under 35 USC 119 from Japanese Patent Application No. 2019-050779 filed on Mar. 19, 2019, the disclosure of which is incorporated by reference herein.

BACKGROUND

Technical Field

The present invention relates to a vehicle lower section structure.

Related Art

In vehicles such as hybrid vehicles and electric vehicles, contactless charging modules attached to a suspension member are known (see, for example, Japanese Patent Application Laid-Open (JP-A) No. 2018-086906). Such contactless charging modules receive power from a power supply module without contact installed in a parking lot or the like. The contactless charging module supplies power supplied from the power supply module to a battery mounted in the vehicle.

Examples of technology relating to a contactless charging module can be found in JP-A Nos. 2013-219861 and 2014-128124.

An under-cover configured to reduce air resistance caused by air flowing beneath the vehicle is installed at a vehicle lower side of the suspension member. Such under-covers sometimes double in function as an electromagnetic shield that blocks electromagnetic waves generated by an electric motor, power control unit (PCU), or the like mounted in the vehicle.

However, the following concern arises if a contactless charging module attached to a suspension member is covered from the vehicle lower side by an under-cover that also functions as an electromagnetic shield. Namely, there is a possibility that the power from a power supply module to the contactless charging module without contact may be obstructed by the under-cover.

SUMMARY

In consideration of the above circumstances, an object of the present disclosure is to provide a vehicle lower section structure that enables power from a power supply module to a contactless charging module without contact, while suppressing air resistance beneath a vehicle using an under-cover including an electromagnetic shield function.

A vehicle lower section structure according to a first aspect includes, a suspension member, a contactless charging module attached to the suspension member and configured to receive power from a power supply module without contact, and an electrically conductive under-cover disposed adjacent to the contactless charging module in a vehicle front-rear direction at a vehicle lower side of the suspension member, and covering the suspension member from the vehicle lower side.

In the above configuration, the contactless charging module that receives a power supply from the power supply module is attached to the suspension member. The under-cover is disposed at the vehicle lower side of the suspension member. The suspension member is covered from the vehicle lower side by the under-cover, thereby reducing air resistance caused by air flowing beneath the vehicle. Power consumption (power costs) or fuel consumption (fuel costs) during travel of the vehicle is thus reduced.

The under-cover is electrically conductive. Thus, for example, electromagnetic waves generated by an electric motor, PCU, or the like mounted to the vehicle are blocked by the under-cover. Namely, the under-cover of the present aspect doubles in function as an electromagnetic shield.

The under-cover is disposed adjacent to the contactless charging module in the vehicle front-rear direction. The under-cover is thereby suppressed from obstructing the power from the power supply module to the contactless charging module without contact.

In this manner, in the present aspect, the under-cover that also functions as an electromagnetic shield enables power from the power supply module to the contactless charging module without contact, while reducing air resistance beneath the vehicle.

A vehicle lower section structure according to a second aspect is the vehicle lower section structure according to the first aspect, in which, an end portion of the under-cover at a side of the contactless charging module is attached to the contactless charging module from the vehicle lower side.

In the above configuration, the end portion of the under-cover at a side of the contactless charging module is attached to the contactless charging module from the vehicle lower side. This enables the under-cover to be removed from a vehicle lower section without removing the contactless charging module from the suspension member. This improves the ease of maintenance of the under-cover and the vehicle lower section.

Moreover, in the present aspect, since the under-cover is not present between the suspension member and the contactless charging module, the contactless charging module can be precisely disposed at a predetermined height (installation height). This enables the contactless charging module to be disposed at a predetermined height with respect to the power supply module during power from the power supply module to the contactless charging module without contact. This thereby enables power to be supplied from the power supply module to the contactless charging module at a predetermined efficiency.

A vehicle lower section structure according to a third aspect is the vehicle lower section structure according to the first aspect, in which, an end portion of the contactless charging module at a side of the under-cover is attached to the under-cover from the vehicle lower side.

In the above configuration, the end portion of the contactless charging module at a side of the under-cover is attached to the under-cover from the vehicle lower side. This enables the contactless charging module to be removed from the suspension member without removing the under-cover from the vehicle lower section. This improves the ease of maintenance of the contactless charging module.

Moreover, in the present aspect, the under-cover is present between the suspension member and the contactless charging module. Accordingly, in the present aspect, during power from the power supply module to the contactless charging module without contact, the contactless charging module is located closer to the power supply module than in cases in which the under-cover is not present between the suspension member and the contactless charging module. This results in good sensitivity between the power supply module and the contactless charging module during contactless charging.

A vehicle lower section structure according to a fourth aspect is the vehicle lower section structure according to any one of the first aspect to the third aspect, in which, the contactless charging module includes, a contactless charging module body, and a cover bracket that is provided at an end portion of the contactless charging module body at a side of the under-cover, and that is coupled to the under-cover.

In the above configuration, the cover bracket is provided at the end portion of the contactless charging module at a side of the under-cover. The ease of attachment of the under-cover to the contactless charging module is improved by coupling the under-cover to the cover bracket.

A vehicle lower section structure according to a fifth aspect is the vehicle lower section structure according to the fourth aspect when dependent from the second aspect, wherein a lower face of the end portion of the under-cover at a side of the contactless charging module is disposed in the same plane as the lower face of the end portion of the contactless charging module body at a side of the under-cover.

In the above configuration, the lower face of the end portion of the under-cover at a side of the contactless charging module is disposed in the same plane as the lower face of the end portion of the contactless charging module body at a side of the under-cover. This reduces air resistance caused by air flowing beneath a boundary between the under-cover and the contactless charging module body. This further reduces power consumption or fuel consumption during travel of the vehicle.

As described above, the vehicle lower section structure according to the present disclosure enables power from the power supply module to the contactless charging module without contact, while suppressing air resistance caused by air flowing beneath the vehicle using the under-cover including an electromagnetic shield function.

BRIEF DESCRIPTION OF THE DRAWINGS

Exemplary embodiments of the present disclosure will be described in detail based on the following figures, wherein.

DETAILED DESCRIPTION

Figure 1:
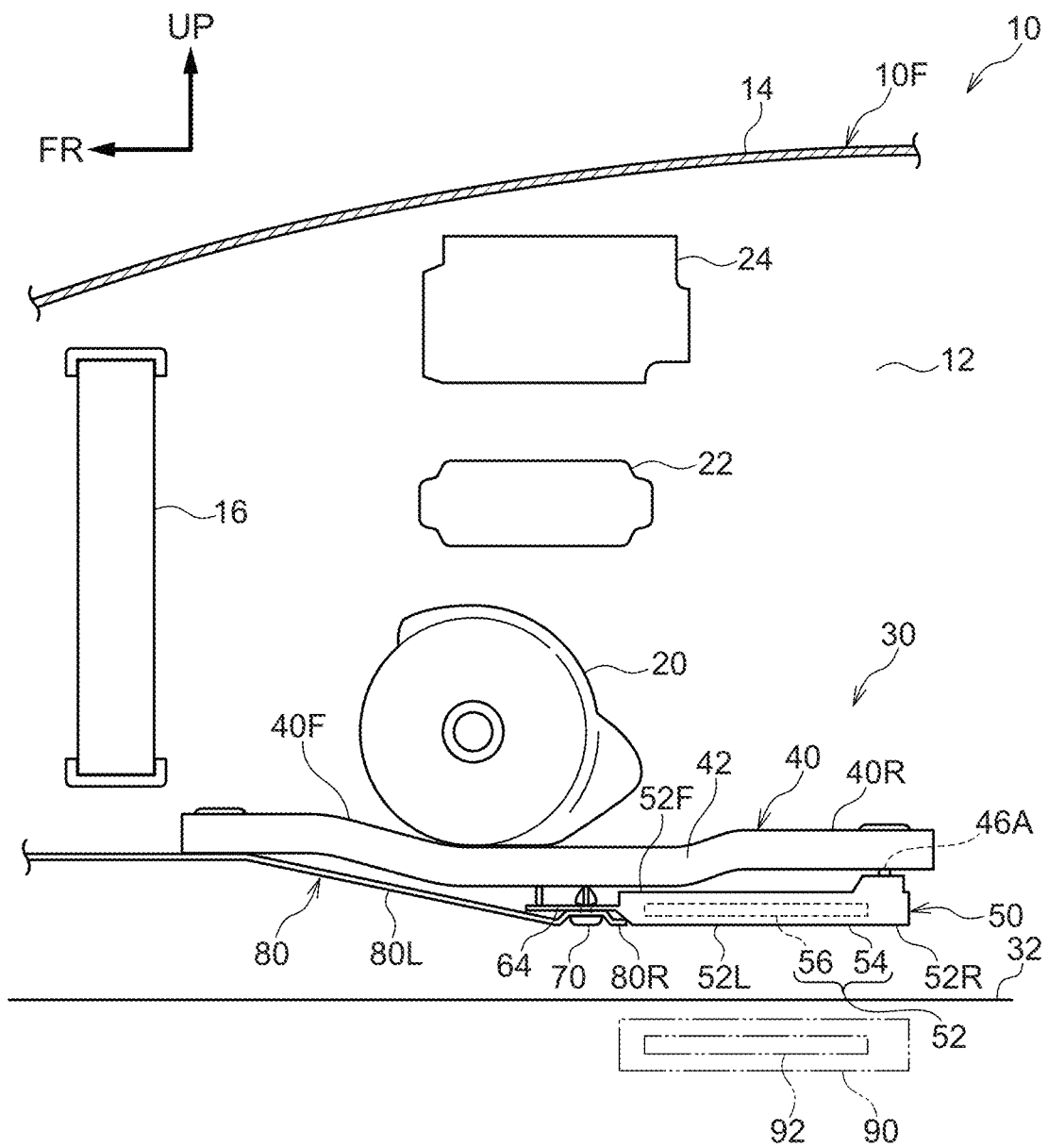
FIG. 1 is a vertically-sectioned cross-section illustrating a vehicle front section applied with a vehicle lower section structure according to an exemplary embodiment.

Explanation follows regarding a vehicle lower section structure according to an exemplary embodiment, with reference to the drawings. In the drawings, the arrow FR indicates a vehicle front side (vehicle front-rear direction front side), and the arrow UP indicates a vehicle upper side (vehicle vertical direction upper side) as appropriate. The arrow OUT indicates a vehicle width direction outer side. In the following explanation, unless specifically stated otherwise, reference simply to front and rear, upward and downward, and left and right refers to front and rear in the vehicle front-rear direction, upward and downward in the vehicle vertical direction, and left and right in the vehicle width direction.

Vehicle Front Section

FIG. 1 illustrates a vehicle front section 10F of a vehicle 10 applied with a vehicle lower section structure 30 according to the present exemplary embodiment. The vehicle 10 is, for example, a hybrid vehicle or an electric vehicle. The vehicle front section 10F of the vehicle 10 is provided with a power unit compartment 12.

The power unit compartment 12 is covered from the vehicle upper side by a hood 14. A radiator 16 and the like are disposed at the vehicle front side of the power unit compartment 12. An electric motor 20, a power control unit (PCU) 22, and a high voltage unit (voltage unit) 24 that generate electromagnetic waves are housed inside the power unit compartment 12.

Figure 2:
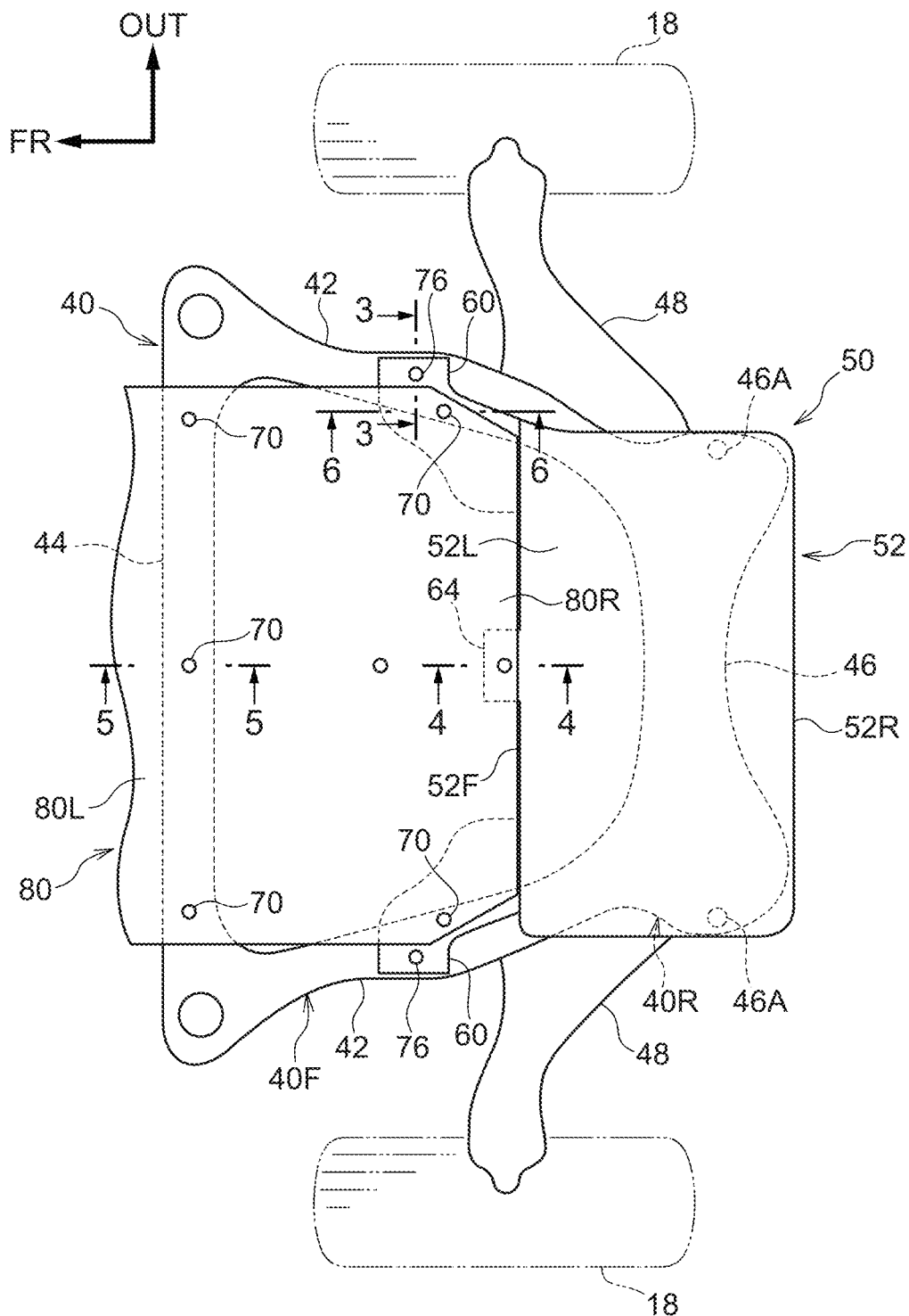
FIG. 2 is a plan view (bottom face view) illustrating the vehicle front section illustrated in FIG. 1 as viewed from a vehicle lower side.

The electric motor 20 configures a drive source that drives rotation of front tires 18 (see FIG. 2). The electric motor 20 is disposed between a pair of front side members, not illustrated in the drawings. A battery, not illustrated in the drawings, is connected to the electric motor 20 through the PCU 22. A contactless charging module 50, described later, is connected to the battery through the high voltage unit 24.

The PCU 22 is disposed at the vehicle upper side of the electric motor 20. For example, the PCU 22 converts direct current into a three-phase alternating current for supply from the non-illustrated battery to the electric motor 20. The high voltage unit 24 includes a DC supply charging relay, a junction box, a DC/DC converter, and so on, and controls power supplied from the contactless charging module 50 to the battery. The vehicle lower section structure 30 according to the present exemplary embodiment is applied at a lower section of the vehicle front section 10F configured in this manner.

Vehicle Lower Section Structure

The vehicle lower section structure 30 includes a suspension member 40, the contactless charging module 50, and an under-cover 80. The suspension member 40 is disposed at the vehicle lower side of the electric motor 20. The suspension member 40 is attached to the non-illustrated pair of front side members from the vehicle lower side.

Suspension Member

As illustrated in FIG. 2, the suspension member 40 is formed in a frame shape in plan view. The suspension member 40 includes a pair of side rails 42, a front cross member 44, and a rear cross member 46.

The pair of side rails 42 are disposed running along the vehicle front-rear direction, and are disposed spaced apart from each other in the vehicle width direction. The pair of side rails 42 configure side portions on both vehicle width direction sides of the suspension member. Respective lower arms 48, serving as suspension arms, are coupled to the pair of side rails 42. The lower arms 48 extend from the pair of side rails 42 toward the vehicle width direction outer sides, and support the wheels of the front tires 18.

The front cross member 44 and the rear cross member 46 are each disposed running along the vehicle width direction, and are disposed spaced apart from each other in the vehicle front-rear direction. The front cross member 44 couples together front end portions of the pair of side rails. The front cross member 44 configures a front end portion of the suspension member 40. The rear cross member 46 couples together rear end portions of the pair of side rails. The rear cross member 46 configures a rear end portion of the suspension member 40.

Contactless Charging Module

As illustrated in FIG. 1, the contactless charging module 50 is disposed at the vehicle lower side of a rear portion 40R of the suspension member 40. The contactless charging module 50 is attached to the rear portion 40R of the suspension member 40 from the vehicle lower side. The contactless charging module 50 covers the rear portion 40R of the suspension member 40 from the vehicle lower side in a state in which the contactless charging module 50 faces a road surface 32. A lower face 52L of a contactless charging module body 52 is, for example, configured as a flat planar face. Air resistance caused by air flowing beneath the vehicle front section 10F is reduced by the contactless charging module body 52.

The contactless charging module 50 includes the contactless charging module body 52, a pair of front side brackets 60, and a cover bracket 64. The contactless charging module body 52 includes a case 54 and a power-receiving coil 56. The case 54 is formed from resin or the like and has a flattened box shape. The power-receiving coil 56 is accommodated inside the case 54. The power-receiving coil 56 is formed by a conductive wire or the like.

The power-receiving coil 56 is, for example, disposed so as to face a power transmission coil 92 of a power supply module 90 installed in a parking lot in the vehicle vertical direction. When the power supply module 90 is actuated in this state, for example, contactless power is supplied from the power transmission coil 92 to the power-receiving coil 56 by electromagnetic induction. Power supplied to the power-receiving coil 56 is supplied to the battery of the vehicle 10 through the high voltage unit 24 described above.

The power-receiving coil 56 is electrically conductive. The power-receiving coil 56 accordingly also functions as an electromagnetic shield that blocks electromagnetic waves generated by the electric motor 20, the PCU 22, and the high voltage unit 24 housed in the power unit compartment 12.

As illustrated in FIG. 1 and FIG. 2, a rear end portion 52R of the contactless charging module body 52 is attached to coupling portions 46A of the rear cross member 46 of the suspension member 40 from the vehicle lower side, for example using bolts. Note that there is no limitation to attaching the rear end portion 52R of the contactless charging module body 52 to the suspension member 40, and the rear end portion 52R of the contactless charging module body 52 may be attached to another member configuring a vehicle lower section.

As illustrated in FIG. 2, a front end portion 52F of the contactless charging module body 52 is provided with the pair of front side brackets 60. The pair of front side brackets 60 extend from locations on both vehicle width direction sides of the front end portion 52F of the contactless charging module body 52 toward the vehicle front side, and toward the vehicle width direction outer sides.

Figure 3:
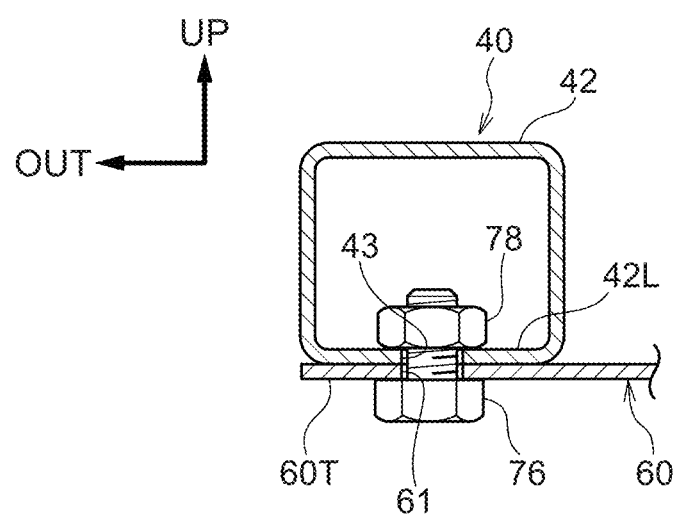
FIG. 3 is a cross-section sectioned along line 3-3 in FIG. 2.

As illustrated in FIG. 3, leading end portions 60T (front end portions) of the respective front side brackets 60 are disposed at the vehicle lower sides of the pair of side rails 42 of the suspension member 40. The leading end portions 60T of the front side brackets 60 are each formed with a through hole 61 penetrating the leading end portion 60T in its thickness direction (vehicle vertical direction).

Each of the side rails 42 is formed in a tube shape. Moreover, each of the side rails 42 has a rectangular cross-section profile. Lower walls 42L of the respective side rails 42 are each formed with a through hole 43 penetrating the lower wall 42L in its thickness direction (vehicle vertical direction). The leading end portions 60T of the front side brackets 60 are coupled (fixed) to the lower walls 42L of the side rails 42 using nuts 78, and bolts 76 inserted through the through holes 43, 61 from the vehicle lower side.

Note that the front side brackets 60 configure an example of suspension member brackets.

Figure 4:
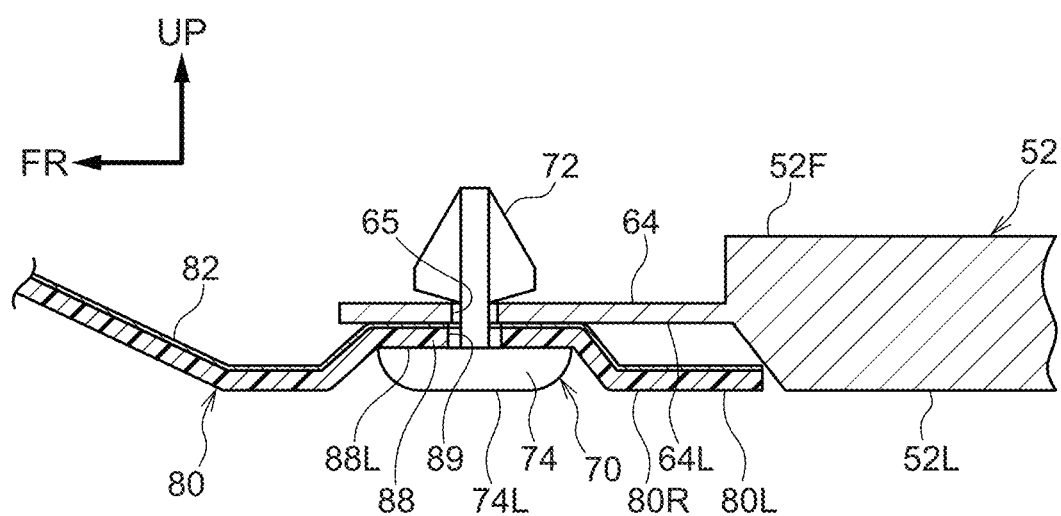
FIG. 4 is a cross-section sectioned along line 4-4 in FIG. 2.

As illustrated in FIG. 2, a vehicle width direction central portion of the front end portion 52F of the contactless charging module body 52 is provided with the cover bracket 64. As illustrated in FIG. 4, the cover bracket 64 is formed in a plate shape. The cover bracket 64 extends from a thickness direction (vehicle vertical direction) intermediate portion of the front end portion 52F of the contactless charging module body 52 toward the vehicle front side. A step is formed between a lower face 64L of the cover bracket 64 and the lower face 52L of the contactless charging module body 52 (case 54).

The cover bracket 64 is formed with a through hole 65 penetrating the cover bracket 64 in its thickness direction (vehicle vertical direction). A rear end portion 80R of the under-cover 80, described below, is attached to the cover bracket 64 from the vehicle lower side.

The cover bracket 64 may be integrally formed to the contactless charging module body 52. Alternatively, the cover bracket 64 may be formed as a separate body to the contactless charging module body 52 and then attached to the contactless charging module body 52.

Under-Cover

As illustrated in FIG. 1, the under-cover 80 is disposed at the vehicle front side of the contactless charging module 50, and at the vehicle lower side of a front portion 40F of the suspension member 40. The under-cover 80 is disposed adjacent to the contactless charging module 50 in the vehicle front-rear direction. The under-cover 80 is formed in a panel shape to cover the front portion 40F of the suspension member 40 from the vehicle lower side. A lower face 80L of the under-cover 80 is configured as a flat planar face. Air resistance caused by air flowing beneath the vehicle front section 10F is reduced by the under-cover 80.

In the present exemplary embodiment, the concept that the under-cover 80 and the contactless charging module 50 are adjacent in the vehicle front-rear direction encompasses both cases in which the under-cover 80 and the contactless charging module 50 are contiguous to each other in the vehicle front-rear direction, and cases in which a gap is present between the under-cover 80 and the contactless charging module 50 within a range that does not affect air pressure beneath the boundary between the under-cover 80 and the contactless charging module 50.

The under-cover 80 is disposed at the vehicle lower side of the electric motor 20, the PCU 22, and the high voltage unit 24 housed within the power unit compartment 12. The under-cover 80 is electrically conductive, and doubles in function as an electromagnetic shield. Specifically, an upper face 80U of the under-cover 80 is covered by an electrically conductive layer 82 (see FIG. 4) configured by an aluminum sheet or the like. Electromagnetic waves generated by the electric motor 20, the PCU 22, and the high voltage unit 24 housed within the power unit compartment 12 are blocked by the electrically conductive layer 82.

Figure 5:
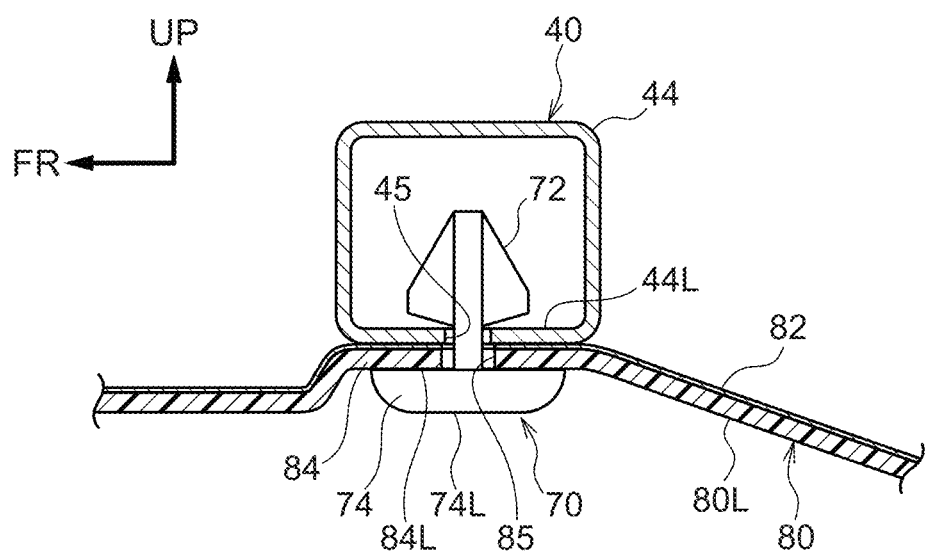
FIG. 5 is a cross-section sectioned along line 5-5 in FIG. 2.

As illustrated in FIG. 2, the front side of the under-cover 80 is attached to the front cross member 44 of the suspension member 40 from the vehicle lower side by plural clips 70. Specifically, as illustrated in FIG. 5, an attachment recess 84 recessed toward the vehicle upper side is formed in the front side of the under-cover 80. The attachment recess 84 is disposed at the vehicle lower side of the front cross member 44. The attachment recess 84 is formed with through holes 85 penetrating the attachment recess 84 in its thickness direction (vehicle vertical direction).

The front cross member 44 is formed with a tube shaped cross-section profile. A lower wall 44L of the front cross member 44 is formed with through holes 45 penetrating the lower wall 44L in its thickness direction (vehicle vertical direction). Clip bodies 72 of the respective clips 70 are fitted into the through holes 45 and the corresponding through holes 85 in the attachment recess 84 from the vehicle lower side. Flanges 74 of the respective clips 70 engage with a recess bottom face 84L of the attachment recess 84. The attachment recess 84 of the under-cover 80 is coupled (fixed) to the lower wall 44L of the front cross member 44 by the clips 70.

As illustrated in FIG. 2, the two vehicle width direction sides of the rear end portion 80R of the under-cover 80 are attached to the pair of front side brackets 60 of the contactless charging module 50 from the vehicle lower side by plural clips 70.

Figure 6:
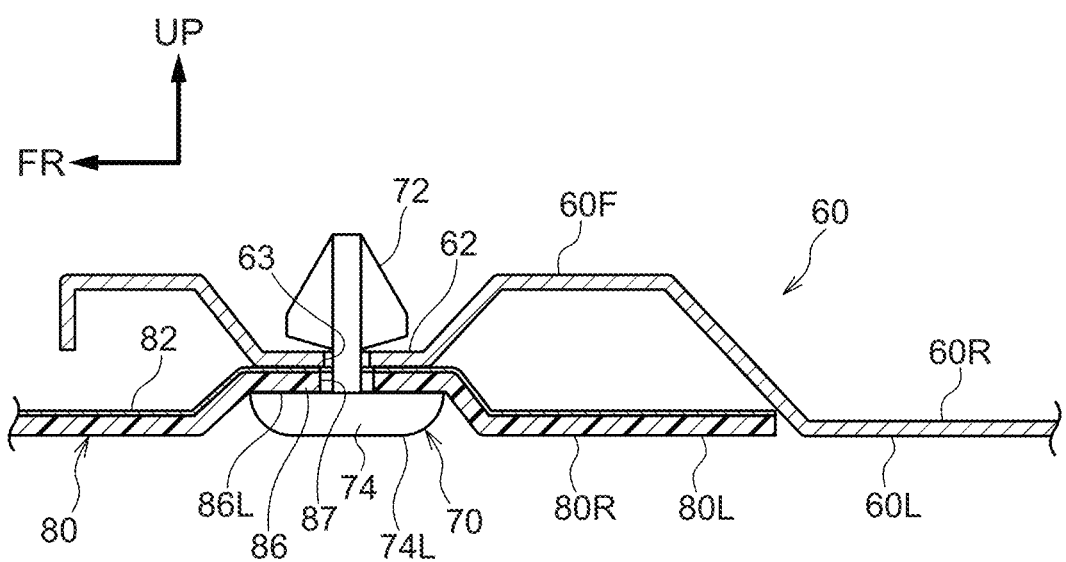
FIG. 6 is a cross-section sectioned along line 6-6 in FIG. 2.

Specifically, as illustrated in FIG. 6, both vehicle width direction sides of the rear end portion 80R of the under-cover 80 are formed with an attachment recess 86 recessed toward the vehicle upper side. Each of the attachment recesses 86 is formed with a through hole 87 penetrating the attachment recess 86 in its thickness direction (vehicle vertical direction).

A front portion 60F of each of the front side brackets 60 is formed with a cover coupling portion 62 projecting toward the vehicle lower side. Each of the cover coupling portions 62 is formed with a through hole 63 penetrating the cover coupling portion 62 in its thickness direction (vehicle vertical direction). Clip bodies 72 of the respective clips 70 are fitted into the through holes 63 and the corresponding through holes 87 in the attachment recesses 86 from the vehicle lower side. Flanges 74 of the clips 70 engage with bottom faces 86L of the attachment recesses 86. The attachment recesses 86 of the under-cover 80 are coupled (fixed) to the cover coupling portions 62 of the front side brackets 60 by the clips 70.

The flanges 74 of the respective clips 70 are housed within the attachment recesses 86. A lower face 74L of each of the flanges 74 is disposed in the same plane as the lower face 80L of the rear end portion 80R of the under-cover 80. Air resistance caused by air flowing beneath the attachment recesses 86 is thereby reduced. Moreover, the lower face 80L of the rear end portion 80R of the under-cover 80 is disposed in the same plane as a lower face 60L of a rear portion 60R of each of the front side brackets 60. Air resistance caused by air flowing beneath the boundary between the rear end portion 80R of the under-cover 80 and the rear portions 60R of the front side brackets 60 is thereby reduced.

As illustrated in FIG. 2, a vehicle width direction central portion of the rear end portion 80R of the under-cover 80 is attached to the cover bracket 64 of the contactless charging module 50 from the vehicle lower side by a clip 70.

Specifically, as illustrated in FIG. 4, the vehicle width direction central portion of the rear end portion 80R of the under-cover 80 is formed with an attachment recess 88 recessed toward the vehicle upper side. The attachment recess 88 is superimposed on the lower face 64L of the cover bracket 64 from the vehicle lower side. The attachment recess 88 is formed with a through hole 89 penetrating the attachment recess 88 in its thickness direction (vehicle vertical direction).

A clip body 72 of the corresponding clip 70 is fitted into the through hole 89 in the attachment recess 88 and the through hole 65 in the cover bracket 64 previously described from the vehicle lower side. A flange 74 of the clip 70 engages with a bottom face 88L of the attachment recess 88. The attachment recess 88 is coupled (fixed) to the cover bracket 64 by the clip 70.

The flange 74 of the clip 70 is housed within the attachment recess 88. A lower face 74L of the flange 74 is disposed in the same plane as the lower face 80L of the rear end portion 80R of the under-cover 80. Air resistance caused by air flowing beneath the attachment recess 88 is thereby reduced. Moreover, the lower face 80L of the rear end portion 80R of the under-cover 80 is disposed in the same plane as the lower face 52L of the contactless charging module body 52 (case 54). Air resistance caused by air flowing beneath the boundary between the rear end portion 80R of the under-cover 80 and the contactless charging module body 52 is thereby reduced.

Note that in the present exemplary embodiment, the concept of being "in the same plane" is not limited to cases in which two faces are disposed in exactly the same plane, and encompasses cases in which a slight step is formed between the two faces as a result of manufacturing tolerance or the like. Accordingly, for example, the concept of the lower face 52L of the contactless charging module body 52 and the lower face 80L of the under-cover 80 disposed in the same plane as each other is not limited to cases in which the two lower faces 52L, 80L are disposed in exactly the same plane, and also encompasses cases in which a slight step is formed between the two lower faces 52L, 80L as a result of manufacturing tolerance or the like. The rear end portion 80R of the under-cover 80 is an example of an end portion on the contactless charging module 50 side of the under-cover 80.

Operation

Explanation follows regarding operation of the present exemplary embodiment.

As illustrated in FIG. 1, in the vehicle lower section structure 30 according to the present exemplary embodiment, the contactless charging module 50 that receives power supply from the power supply module 90 is attached to the rear portion 40R of the suspension member 40. The under-cover 80 is disposed at the vehicle lower side of the front portion 40F of the suspension member 40. The lower face 80L of the under-cover 80 is configured as a flat planar face. Due to covering the front portion 40F of the suspension member 40 from the vehicle lower side with the under-cover 80, air resistance caused by air flowing beneath the vehicle front section 10F is reduced. Power consumption (power costs) or fuel consumption (fuel costs) during travel of the vehicle 10 is thus reduced.

The under-cover 80 is electrically conductive. Specifically, the upper face 80U of the under-cover 80 is covered by the electrically conductive layer 82 (see FIG. 4). Electromagnetic waves generates by the electric motor 20, the PCU 22, the high voltage unit 24 and the like mounted in the power unit compartment 12 are thus blocked by the under-cover 80. Namely, the under-cover 80 of the present exemplary embodiment doubles in function as an electromagnetic shield.

The under-cover 80 is disposed adjacent to the contactless charging module 50 in the vehicle front-rear direction. More specifically, the under-cover 80 is disposed at the vehicle front side of the contactless charging module body 52. Accordingly, the under-cover 80 is suppressed from obstructing the power from the power transmission coil 92 of the power supply module 90 to the power-receiving coil 56 of the contactless charging module body 52 without contact.

In this manner, in the present exemplary embodiment, the under-cover 80 that also functions as an electromagnetic shield enables power from the power supply module 90 to the contactless charging module 50 without contact, while reducing air resistance beneath the vehicle front section 10F.

The lower face 52L of the contactless charging module body 52 of the contactless charging module 50 is configured as a flat planar face. The rear portion 40R of the suspension member 40 is covered from the vehicle lower side by the contactless charging module body 52, thereby reducing air resistance caused by air flowing beneath the vehicle front section 10F. This further reduces power consumption (power costs) or fuel consumption (fuel costs) during travel of the vehicle 10.

As illustrated in FIG. 2, the front side of the under-cover 80 is attached to the front cross member 44 of the suspension member 40 from the vehicle lower side by the plural clips 70. Moreover, the rear end portion 80R of the under-cover 80 is attached to both the pair of front side brackets 60 and the cover bracket 64 of the contactless charging module 50 from the vehicle lower side by the plural clips 70.

This enables the under-cover 80 to be removed from the suspension member 40 without removing the contactless charging module 50 from the suspension member 40. This thereby improves the ease of maintenance of the under-cover 80 and the lower portion of the vehicle front section 10F.

As described above, the front end portion 52F of the contactless charging module body 52 is provided with the pair of front side brackets 60 and the cover bracket 64. The ease of attachment of the under-cover 80 to the contactless charging module 50 is improved by coupling the rear end portion 80R of the under-cover 80 to the pair of front side brackets 60 and the cover bracket 64.

As illustrated in FIG. 6, the flanges 74 of the corresponding clips 70 are housed in the attachment recesses 86 of the rear end portion 80R of the under-cover 80. The lower faces 74L of the flanges 74 of the clips 70 is disposed in the same plane as the lower face 80L of the rear end portion 80R of the under-cover 80. Air resistance caused by air flowing beneath the rear end portion 80R of the under-cover 80 is thereby reduced.

The lower face 80L of the rear end portion 80R of the under-cover 80 is disposed in the same plane as the lower faces 60L of the rear portions 60R of the front side brackets 60. Air resistance caused by air flowing beneath the boundary between the rear end portion 80R of the under-cover 80 and the rear portions 60R of the front side brackets 60 is thereby reduced.

As illustrated in FIG. 4, the flange 74 of the corresponding clip 70 is housed in the attachment recess 88 of the rear end portion 80R of the under-cover 80. The lower face 74L of the flange 74 of the clip 70 is disposed in the same plane as the lower face 80L of the rear end portion 80R of the under-cover 80. Air resistance caused by air flowing beneath the rear end portion 80R of the under-cover 80 is thereby reduced.

The lower face 80L of the rear end portion 80R of the under-cover 80 is disposed in the same plane as the lower face 52L of the front end portion 52F of the contactless charging module body 52. Air resistance caused by air flowing beneath the boundary between the rear end portion 80R of the under-cover 80 and the front end portion 52F of the contactless charging module body 52 is thereby reduced.

Moreover, in the present exemplary embodiment, since the under-cover 80 is not present between the suspension member 40 and the contactless charging module 50, the contactless charging module 50 can be precisely installed at a predetermined height (installation height). This enables the contactless charging module 50 to be disposed at a predetermined height with respect to the power supply module 90 during power from the power supply module 90 to the contactless charging module 50 without contact. This thereby enables power to be supplied from the power supply module 90 to the contactless charging module 50 at a predetermined efficiency.

Figure 7:
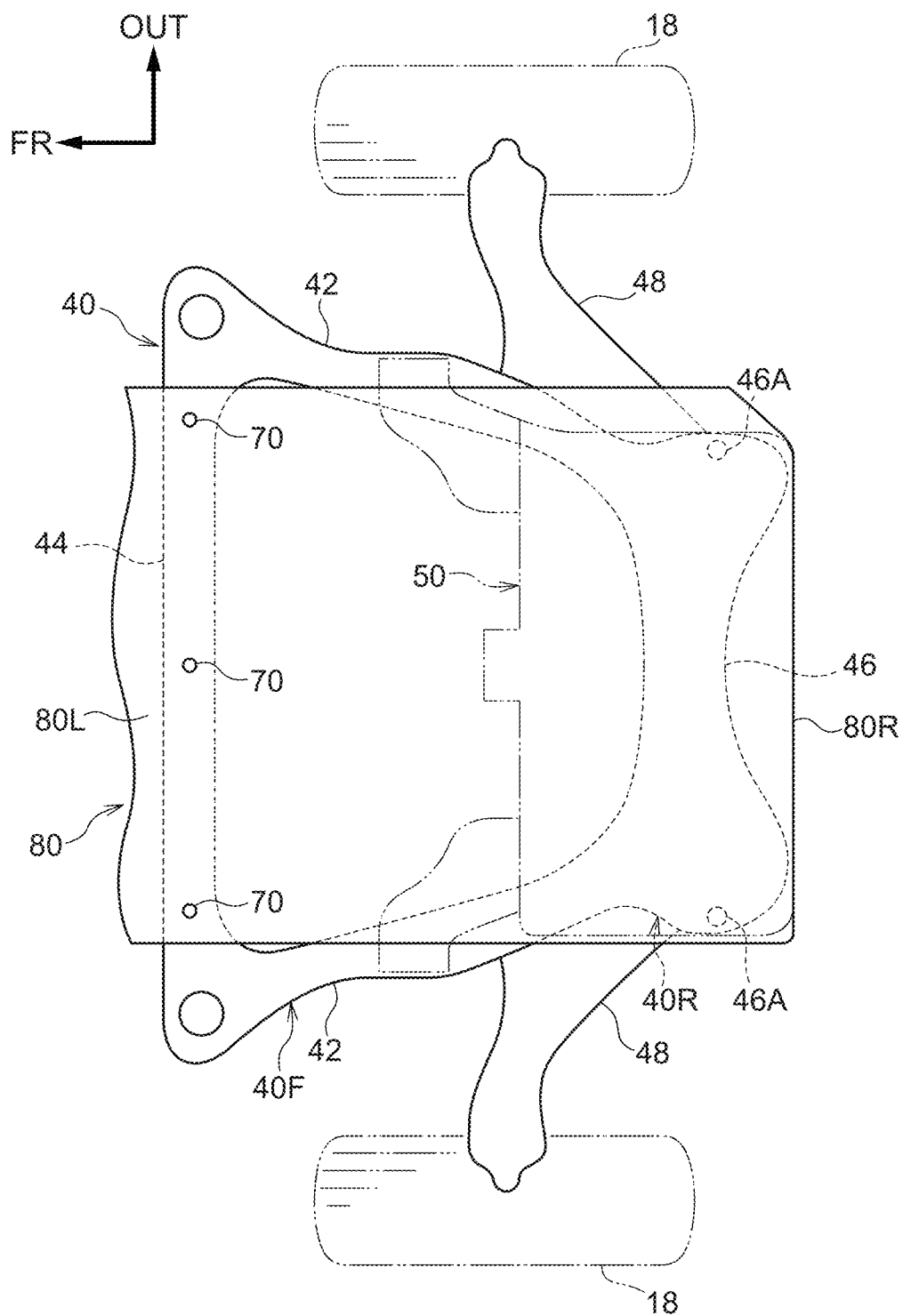
FIG. 7 is a plan view (bottom face view) illustrating a vehicle front section applied with a vehicle lower section structure according to a modified example of an exemplary embodiment as viewed from the vehicle lower side.

As illustrated in FIG. 7, in a vehicle to which the contactless charging module 50 is not mounted, for example, the under-cover 80 is extended to the vehicle lower side of the rear portion 40R of the suspension member 40. In such cases, the rear end portion 80R of the under-cover 80 may be attached to the coupling portions 46A provided to the rear cross member 46 of the suspension member 40 for coupling to the contactless charging module body 52.

MODIFIED EXAMPLES

Explanation follows regarding modified examples of the exemplary embodiment described above.

In the exemplary embodiment described above, the cover bracket 64 is provided at the vehicle width direction central portion of the front end portion 52F of the contactless charging module body 52. However, the placement and number of cover brackets 64 may be modified as appropriate. For example, a cover bracket may be provided on one vehicle width direction side of the front end portion 52F of the contactless charging module body 52.

Moreover, in the exemplary embodiment described above, the attachment recesses 84, 86, 88 of the under-cover 80 are respectively attached to the front cross member 44 of the suspension member 40, the pair of front side brackets 60, and the cover bracket 64 using the clips 70. However, the attachment recesses 84, 86, 88 of the under-cover 80 may be attached to the front cross member 44 of the suspension member 40, the pair of front side brackets 60, and the cover bracket 64 using bolts or the like.

In the exemplary embodiment described above, the rear end portion 80R of the under-cover 80 is attached to the contactless charging module 50 from the vehicle lower side. However, a front end portion of the contactless charging module 50, namely an end portion on the under-cover 80 side of the contactless charging module 50, may be attached to the rear end portion 80R of the under-cover 80 from the vehicle lower side. Such cases enable the contactless charging module 50 to be removed from the suspension member 40 without removing the under-cover 80 from the vehicle lower section. This improves the ease of maintenance of the contactless charging module 50.

In such cases, the under-cover 80 is present between the suspension member 40 and the contactless charging module 50. Accordingly, during power from the power supply module 90 to the contactless charging module 50 without contact, the contactless charging module 50 is located closer to the power supply module 90 than in cases in which the under-cover 80 is not present between the suspension member 40 and the contactless charging module 50. This results in good sensitivity between the power supply module 90 and the contactless charging module 50 during contactless charging.

In the exemplary embodiment described above, the under-cover 80 is attached to the contactless charging module 50.

However, it is sufficient that the under-cover 80 and the contactless charging module 50 be disposed adjacent to each other in the vehicle front-rear direction, and the under-cover 80 does not necessarily have to be attached to the contactless charging module 50.

The vehicle lower section structure 30 according to the present exemplary embodiment is applied to the vehicle front section 10F. However, a vehicle lower section structure according to the present exemplary embodiment may also be applied to a vehicle rear section. In such cases, the under-cover is disposed at the vehicle rear side of the contactless charging module. Moreover, for example, a front end portion of the under-cover may be attached to a rear end portion of the contactless charging module from the vehicle lower side, or a rear end portion of the contactless charging module may be attached to a front end portion of the under-cover from the vehicle lower side.

Although explanation has been given regarding an exemplary embodiment of the present invention, the present invention is not limited to such an exemplary embodiment, and obviously the exemplary embodiment may be combined with the respective modified examples, and various modifications may be implemented within a range not departing from the spirit of the present invention.

What is claimed is:

1. A vehicle lower section structure, comprising:
   a suspension member;
   a contactless charging module attached to the suspension member and configured to receive power from a power supply module without contact; and
   an electrically conductive under-cover disposed adjacent to the contactless charging module in a vehicle front-rear direction at a vehicle lower side of the suspension member, and covering the suspension member from the vehicle lower side.

2. The vehicle lower section structure of claim 1, wherein an end portion of the under-cover at a side of the contactless charging module is attached to the contactless charging module from the vehicle lower side.

3. The vehicle lower section structure of claim 1, wherein an end portion of the contactless charging module at a side of the under-cover is attached to the under-cover from the vehicle lower side.

4. The vehicle lower section structure of claim 1, wherein the contactless charging module comprises:
   a contactless charging module body; and
   a cover bracket that is provided at an end portion of the contactless charging module body at a side of the under-cover, and that is coupled to the under-cover.

5. The vehicle lower section structure of claim 2, wherein the contactless charging module comprises:
   a contactless charging module body; and
   a cover bracket provided at an end portion of the contactless charging module body at a side of the under-cover,
   wherein the end portion of the under-cover at the side of the contactless charging module is coupled to the cover bracket from the vehicle lower side.

6. The vehicle lower section structure of claim 5, wherein a step is formed between a lower face of the cover bracket and a lower face of the end portion of the contactless charging module body at the side of the under-cover.

7. The vehicle lower section structure of claim 5, wherein a lower face of the end portion of the under-cover, at the side of the contactless charging module, is disposed in the same plane as the lower face of the end portion of the contactless charging module body at the side of the under-cover.

8. The vehicle lower section structure of claim 5, wherein the end portion of the under-cover, at the side of the contactless charging module, is attached to the cover bracket using a clip or a bolt.

9. The vehicle lower section structure of claim 8, wherein:
   the end portion of the under-cover at the side of the contactless charging module comprises an attachment recess that is recessed toward a vehicle upper side and that is superimposed on a lower face of the cover bracket; and
   the clip comprises:
      a clip body configured to be fitted into a through hole formed in the attachment recess and a through hole formed in the cover bracket; and
      a flange provided at the clip body and including a lower face disposed in the same plane as the lower face of the end portion of the under-cover at the side of the contactless charging module, in a housed state of the flange within the attachment recess.

10. The vehicle lower section structure of claim 1, wherein a lower face of the contactless charging module is configured as a flat planar face.

11. The vehicle lower section structure of claim 1, wherein a lower face of the under-cover is configured as a flat planar face.

12. The vehicle lower section structure of claim 1, wherein the contactless charging module comprises an electrically conductive power-receiving coil configured to receive power supply from a power supply module without contact.

13. The vehicle lower section structure of claim 1, further comprising an electric motor disposed at a vehicle upper side of the suspension member, wherein the under-cover is disposed at the vehicle lower side of the electric motor.

14. The vehicle lower section structure of claim 1, wherein an upper face of the under-cover is covered by an electrically conductive layer.

15. The vehicle lower section structure of claim 1, wherein:
   the contactless charging module is attached to a vehicle rear portion of the suspension member; and
   the under-cover is attached to a vehicle front portion of the suspension member.

* * * * *